United States Patent Office 3,471,880
Patented Oct. 14, 1969

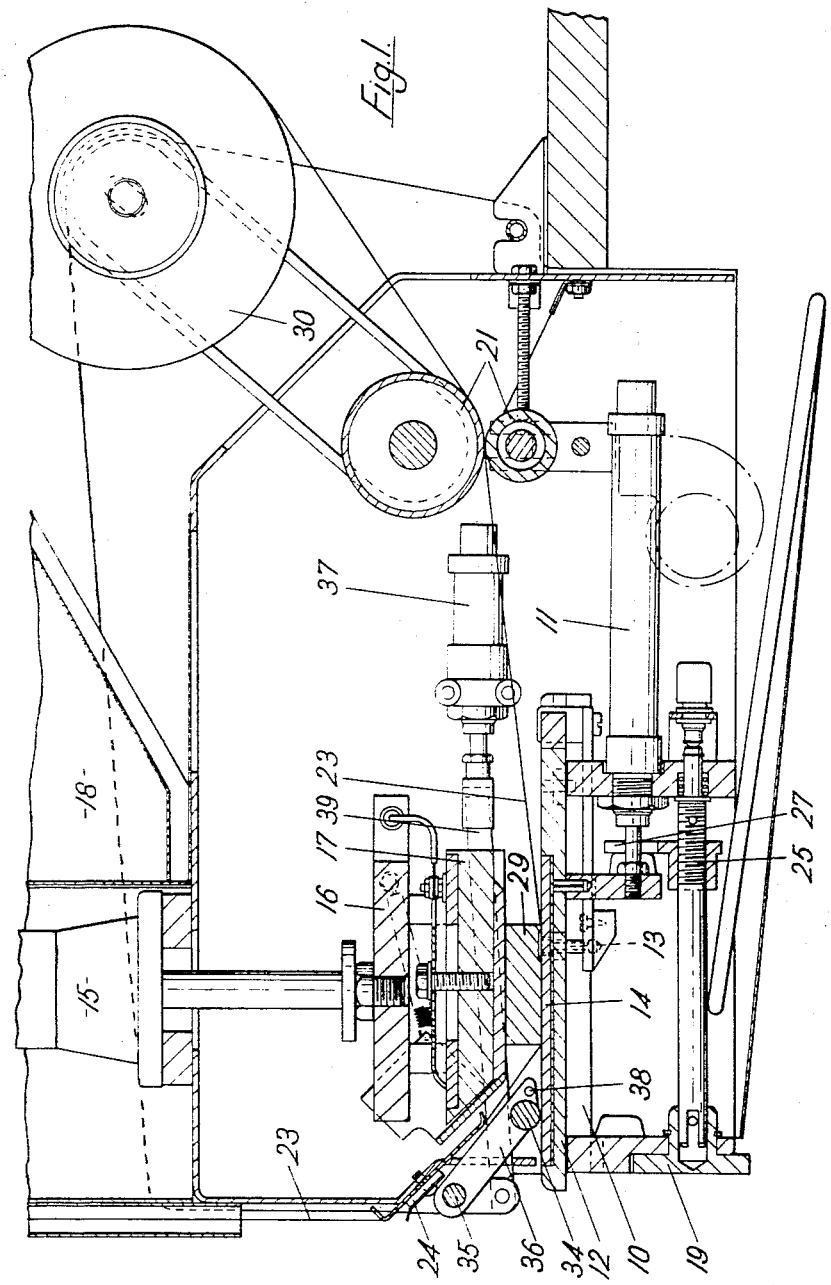

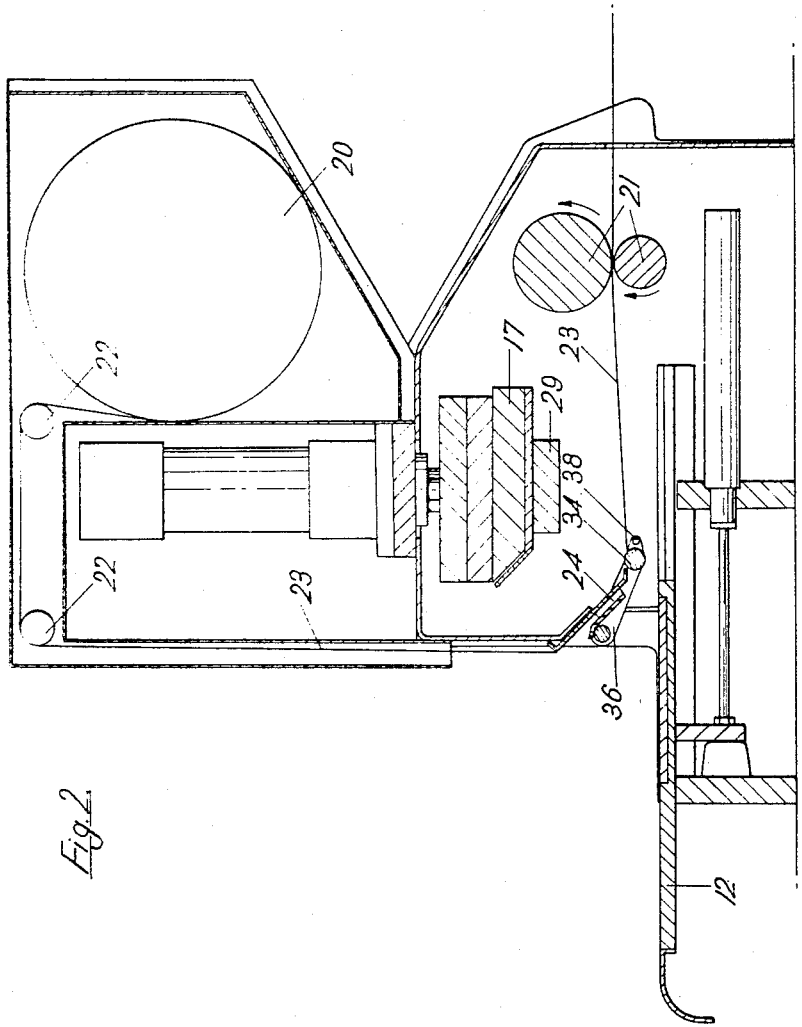

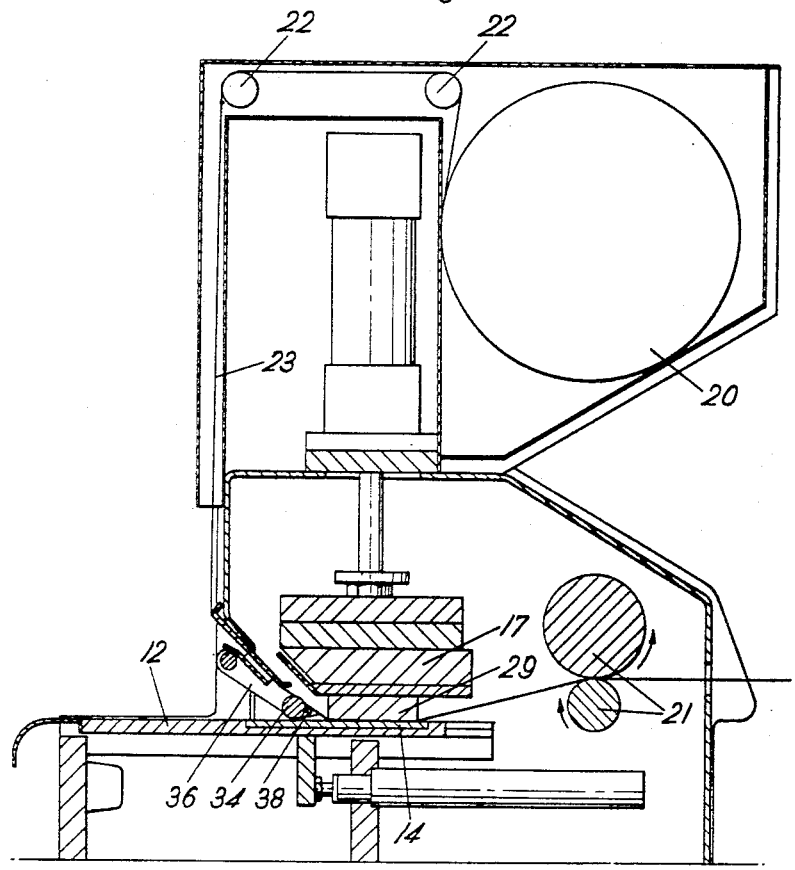

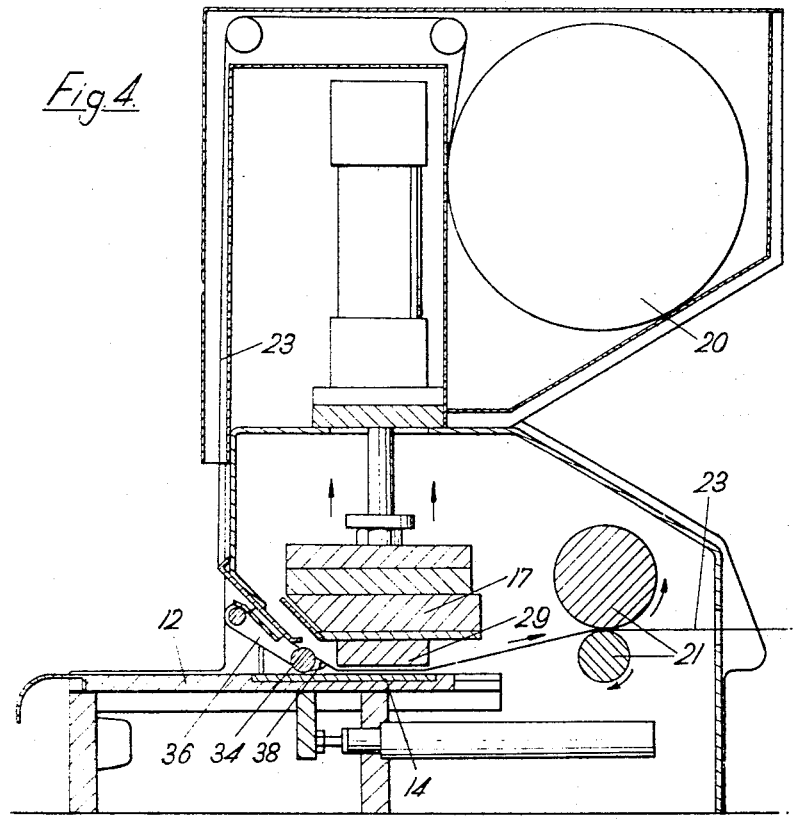
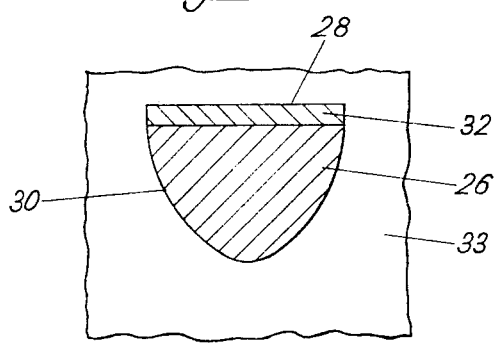

3,471,880
MANUFACTURE OF FOOTWEAR
Malcolm Edward John Wright, Higham Ferrers, and Gordon Cavell Cox, Rushden, England, assignors to Cox & Wright Limited, Rushden, England, a British company
Filed July 24, 1967, Ser. No. 655,531
Claims priority, application Great Britain, July 28, 1966, 34,032/66
Int. Cl. A43d 95/00
U.S. Cl. 12—146          4 Claims

ABSTRACT OF THE DISCLOSURE

In the manufacture of footwear, it is known to reinforce shoe parts by heat-bonding to each a patch of thermoplastic reinforcing material which is supplied to the work station as a coating on a travelling strip of backing material and is transferred from the backing material to the shoe part during the bonding operation. The bonding is performed by closing press platens onto the work during a dwell period in the travel of the backing strip, one of the platens being heated so that an area of thermoplastic reinforcement equal to the area of the heated platen is transferred. The present improvement consists in applying a pull to the backing strip at the instant of separation of the platens so as to slide the strip slightly while it is still in contact with the transferred patch of reinforcement and thereby skive the edge of the patch.

DESCRIPTION OF INVENTION

This invention relates to the stiffening or reinforcing of flexible sheet workpieces, especially in the manufacture of footwear.

Certain parts of shoes require to be reinforced on the inside or unseen side. Thus, the toe cap is often provided on the inside with a stiffening reinforcement known as a toe puff; also the quarters are usually provided with a stiffener known as a counter.

The invention will be described herein with particular reference to shoe toe caps but it is to be understood that it extends to the provision of stiffening reinforcements on all parts of shoes, and indeed to the treatment of other work requiring stiffening or reinforcement of a like character, e.g., shirt collars.

A modern technique for stiffening toe caps is to deposit on their underside a layer of thermoplastic material which is derived from a strip of paper coated with it, the deposition being effected by pressing the strip against the part to be stiffened with the application of heat. The degree of stiffening which is achieved is determined by the thickness or nature of the thermoplastic coating. That which is required varies in accordance with the nature of the shoe and of the shoe material, thickness of material and so on.

A fault which occurs when applying thermoplastic stiffening reinforcements to toe caps by the deposit method referred to above is that the bounding lines or edges of the deposited patch become discernible from the outside and it is the object of this invention to eliminate that fault at least where it is most objectionable.

The known method comprises feeding a strip coated on one side with thermoplastic reinforcing material intermittently through a working station at which is installed a press one platen of which is heated, the coated strip passing between the press platens with its coated side away from the heated platen, placing each workpiece to be reinforced in a flat condition on a plate or pad carried by the other platen of the press, pressing the coated strip onto the workpiece by means of the heated platen while the strip is at rest, with the consequence that a patch of reinforcing material within the area of the heated platen is transferred from the strip to the workpiece, and opening the platens so that the strip separates from the workpiece but leaving the transferred coating material adhered to the workpiece, after which the workpiece is replaced by a fresh one and the strip is fed forward.

According to the present invention, a pull is applied to the strip in the direction of its length immediately before and at the instant of separation of the platens such that there results a sliding of the strip over and in contact with the patch of reinforcing material which has been transferred to the workpiece sufficient to cause a bevelling, scarfing or skiving of the transverse edge of the patch.

Preferably, the transferred patch is rolled before it has completely set. The ultimate result is that, when the invention is applied in shoe manufacture, there is no abrupt line of demarcation between the coated and the uncoated part of the stiffened shoe part which is discernible from the side opposite to that on which the stiffening material has been deposited when the shoe part has been built into the shoe.

The accompanying drawings show an example of a press designed to carry out the deposit method, described in general terms above, for the stiffening of the toe caps of shoes. In the drawings:

FIGURE 1 is a side elevation of the press in cross section,

FIGURES 2, 3 and 4 are diagrams to illustrate the working cycle of the press, and FIGURE 5 is a diagram of the work.

Referring firstly to FIGURE 1, the press has a fixed lower platen 10 which supports a horizontally sliding table 12 having a pressure pad 14 designed to receive in the flat condition a workpiece in the form of a piece of leather or other shoe-making material which is intended to be ultimately shaped and used as the toe cap of a shoe.

The press has an upper platen 16 which carries a heated block 17 and can be raised and lowered by a ram 15 operating according to an adjustable time cycle. The table 12 is slidable by means of a pneumatic cylinder 11 between a retracted position under the upper platen 16 and an extended position in which it projects at the front of the press. The workpiece is placed on the table pad 14 upsidedown, i.e., with its rough face uppermost, while the table is extended, after which the table is retracted under the upper press platen by the cylinder 11. The table 12 has adjustable work clamps 13 and its horizontal position in relation to the upper platen can be adjusted by means of an adjusting wheel 19 which turns a screwed rod 25 and thereby alters the position of the table back stop 27.

In its upper part, the press has an enclosed compartment 18 in which is housed a supply roll 20 (FIGURES 2 to 4) of paper strip coated on one side with a thermoplastic material. The paper strip 23 is pulled off the roll and through the press by a pair of feed rollers 21 the upper one of which is intermittently driven along with a paper take-up reel 31. The strip 23 leaving the supply roll 20 passes forward over guide rollers 22 and then down the front of the press and through a guide slot 24 so as to pass rearward between the press platens 10, 16 with its coated face downwards.

When the press is closed as shown in FIGURE 1, a toe puff form print block 29, carried on the upper press platen 16 under the heated block 17, fuses a predetermined area of the thermoplastic layer on the underside of the strip 23 and presses it on to the rough side of the workpiece. The print block 29 is interchangeable with other such blocks so as to give different toe puff shapes and sizes. On opening the press, the fused patch of thermoplastic material detaches itself from its paper carrier 23 and adheres to the workpiece. Therefore, the feed rollers 21 can be operated to pull the used part of the coated paper strip 23 out of the press and the table 12 can be extended to enable the coated workpiece to be removed and replaced by a new piece, so that the cycle may be repeated.

The workpiece 33 is thus provided with a toe puff patch 26 of stiffening material as shown diagrammatically in FIGURE 5. The bounding lines 28 and 30 of this patch are, when the press is operated in the manner employed hitherto, fairly sharply defined and when the workpiece is lasted to toe cap shape those bounding lines become discernible when the toe cap is viewed from the outside. The discernibility of the curved line 30 is less pronounced than is that of the transverse line 28 and disappears when the toe cap is lasted into the shoe. That of the transverse line is a serious fault.

This fault is eliminated by so timing the operations of the press that the pull exerted by the feed rollers 21 on the paper strip 23 is initiated just before the press platens have released the strip so that the strip, immediately it starts to move, exerts a frictional drag on the deposited patch 26 with the result that there occurs a bevelling, scarfing or skiving of the transverse edge 28 of the patch as indicated at 32 in FIGURE 5. Abruptness in the transition from the unreinforced part to the reinforced part of the toe cap is thus eliminated and the objectionable visibility or discernibility of the edge of the patch from the outside of the finished shoe is avoided.

The timing to produce this desirable result is, of course, fairly critical and has to be established to suit the variable factors such as the nature of the thermoplastic reinforcing material, the nature and thickness of the workpiece and so on, but presents no great difficulty.

The invention is not restricted to use in the case in which the transverse bounding line 28 of the reinforcement 26 is rectilinear. The patch can, for example, be crescent-shaped.

It is found that the relative sliding movement which occurs between the paper strip and the coated workpiece can have the secondary result of thickening the coating some way back from the transverse bounding line 28 of the reinforcement and of causing waviness of the coating. This can be eliminated by a judicious rolling of the coating before it has completely set.

For this purpose, a horizontal transverse finishing roller 34 is carried near the front of the press upon the lower end of a pivotally mounted inclined arm 36. When the machine is at rest with the work table 12 extended, the arm 36 holds the roller in a high position where it is idle, as in FIGURE 2. As the table 12 is retracted the arm 36 is swung downwards about its pivot 35 by means of an operating cylinder 37 and link 39, thereby bringing the roller 34 into contact with the workpiece where it remains until after the press has opened and the table 12 carrying the workpiece has again been extended.

The arm 36 also carries a number of cooling air jets 38 (only one is shown) which play on the reinforcing coating to regulate its temperature and thereby ensure that it will not stick to the roller 34.

The rolling also has the advantage of improving adhesion between the toe cap and the coating.

In one typical example of working of the press according to the invention the following time cycle has been successfully operated. The cycle zero time is when the upper press platen 16 is raised and the work table 12 is extended as in FIGURE 2. From beginning to end of the cycle takes 4 seconds. At zero time the cycle is initiated by means of the operator pressing a start pedal and the table carrying the workpiece begins to retract. At 0.1 sec. the work clamps operate. At 0.2 sec. the finishing roller 34 is lowered. The table reaches its fully retracted position at 1.0 sec. and at 1.1 secs. the print block 29 descends on to the work. The printing period is illustrated in FIGURE 3. At the end of the printing period, the upper press platen commences to rise and the paper strip feeds on, these events both occurring at 3.0 secs., as illustrated in FIGURE 4. At 3.1 secs. the table begins to extend and the cooling air jets 38 commence to operate. The finishing roller rises at 3.8 secs., the work clamps release at 3.9 secs. and the table is fully extended at 4.0 secs. Since the pulling of the strip 23 by the feed rollers is instantaneous whereas the lifting of the upper press platen is not, the feed strip is still held in frictional contact with the work as it begins to feed on.

We claim:
1. A method of reinforcing flexible sheet workpieces, such as shoe parts in the manufacture of footwear, comprising feeding a strip coated on one side with thermoplastic reinforcing material intermittently through a working station at which is installed a press, one platen of which is heated, the coated strip passing between the press platens with its coated side away from the heated platen, placing each workpiece to be reinforced in a flat condition on a plate or pad carried by the other platen of the press, pressing the coated strip on to the workpiece by means of the heated platen while the strip is at rest, with the consequence that a patch of reinforcing material within the area of the heated platen is transferred from the strip to the workpiece, and opening the platens so that the strip separates from the workpiece but leaving the transferred coating material adhered to the workpiece, after which the workpiece is replaced by a fresh one and the strip is fed forward, characterised in that a pull is applied to the strip in the direction of its length immediately before and at the instant of separation of the platens such that there results a sliding of the strip over and in contact with the patch of reinforcing material which has been transferred to the workpiece sufficient to cause a bevelling, scarfing or skiving of the transverse edge of the patch.

2. A method according to claim 1, wherein the transferred patch is rolled before it has completely set.

3. A method according to claim 2, wherein air jets are employed to play on the patch after its application and regulate its temperature thereby ensuring that it does not stick to the roller.

4. A method according to claim 1, wherein the feeding forward of the strip and the opening of the press platens are both initiated at the same instant in the machine time cycle.

References Cited
UNITED STATES PATENTS

| | | | |
|---|---|---|---|
| 1,895,315 | 1/1933 | Fisher | 118—257 |
| 2,213,545 | 9/1940 | Chace et al. | |
| 2,659,341 | 11/1953 | Taggart | 118—257 X |
| 3,278,960 | 10/1966 | Nardone. | |

PATRICK D. LAWSON, Primary Examiner